May 26, 1959 A. J. PETZINGER ET AL 2,888,644
THERMORESPONSIVE METER DEVICES
Filed May 27, 1953
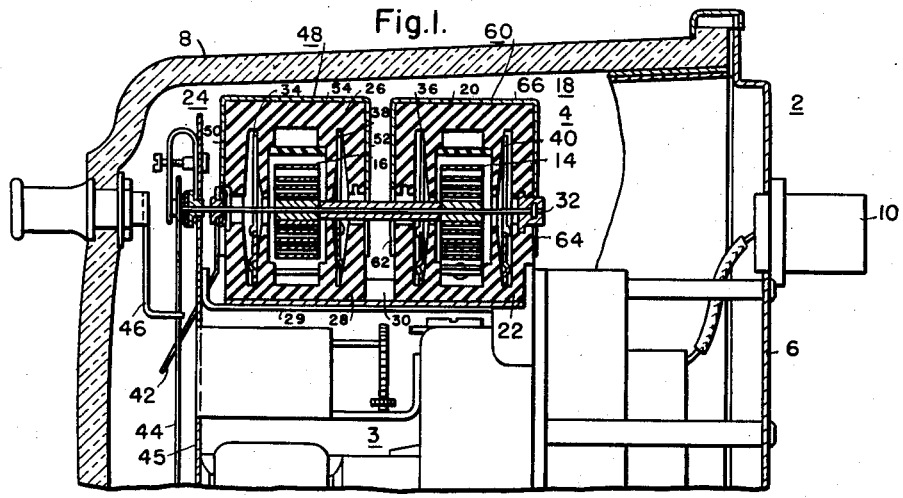
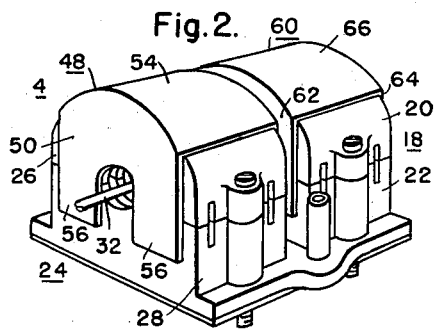
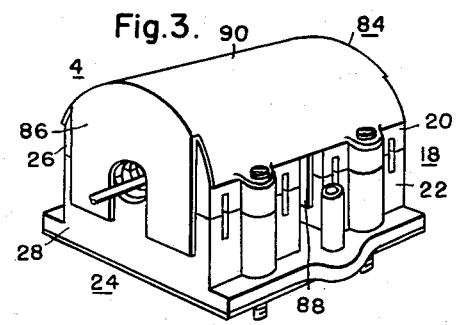
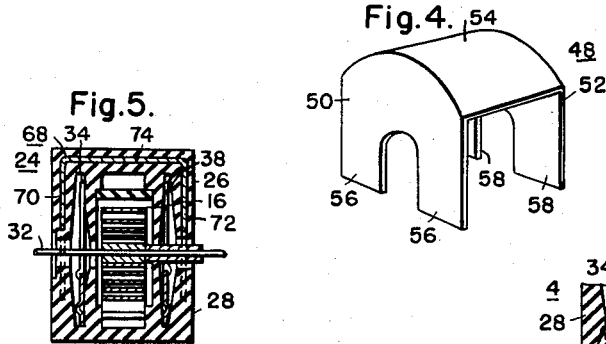
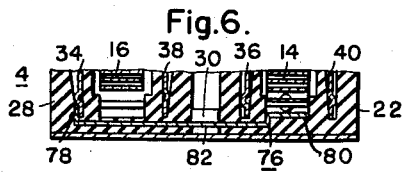
WITNESSES:
E. A. McCloskey
D. M. Schiller
INVENTORS
Ambrose J. Petzinger
and Cornelius Hogenbirk.
BY C. L. Freedman
ATTORNEY United States Patent Office 2,888,644
Patented May 26, 1959

2,888,644

THERMORESPONSIVE METER DEVICES

Ambrose J. Petzinger, Fair Lawn, and Cornelius Hogenbirk, East Orange, N.J., assignors to Westinghouse Electric Corporation, East Pittsburgh, Pa., a corporation of Pennsylvania Application May 27, 1953, Serial No. 357,854

4 Claims. (Cl. 324—104)

This invention relates to thermoresponsive devices, and it has particular relation to thermal meters for measuring a function of the power of an electrical circuit.

In the past, thermal devices have been employed for various purposes, such as relays or as meters for measuring various electrical quantities. A thermal meter for measuring the demand of a single-phase alternating current circuit is shown and described in the patent to H. P. Vassar, No. 2,323,738. However, such thermal meters are extensively utilized to measure the power demand of three-wire alternating current circuits, such as polyphase circuits or three-wire single-phase circuits. In the measurement of the power demand of a three-wire circuit, a two-element meter may be employed. Each element of the two-element meter is connected for energization from a separate pair of wires of the three-wire circuit to provide an indication of the power demand of the circuit in accordance with Blondel's theorem.

The employment of thermal meters with three-wire circuits presents a problem in that proper phase balance between the separate meter elements must be maintained. That is, the response of the meter for the energization of one element thereof by a certain value of power should be substantially equivalent to the response of the meter for the energization of the other element thereof by the same value of power. Thermal meters of the type shown and described in the previously referred to Vassar patent present a special problem as regards phase balance when utilized as two-element meters for the measurement of the power demand of three-wire alternating current circuits.

The thermal meter illustrated in the aforementioned Vassar patent includes first and second thermoresponsive elements and first and second pairs of heaters associated therewith respectively. An insulating enclosure is provided for each thermoresponsive element and the pair of heaters associated therewith. For the purpose of providing a compact structure, the enclosures are preferably positioned adjacent one another. A shaft is mounted for rotation relative to the enclosures under influence of the thermoresponsive elements which are wound about the shaft in opposing relation to produce thereon opposing torques when energized. In order to effect the rotation of the shaft in accordance with the power of an associated electrical circuit, the first and second pairs of heaters are connected respectively for energization in accordance with the vector sum and difference of the alternating voltage and current of the circuit.

In order to provide an indication of the power demand of a three-wire circuit, such as a three-phase alternating-current circuit, by means of a thermal device of the type described, it is necessary to connect one heater of the first pair of heaters and one heater of the second pair of heaters for energization respectively in accordance with the vector sum and difference of a voltage and a current of a separate pair of wires of the circuit to provide one element of the two-element device, and to connect the other heater of the first pair of heaters and the other heater of the second pair of heaters for energization respectively in accordance with the vector sum and difference of a voltage and a current of another pair of wires of the circuit to provide the other element of the two-element device. It is to be noted that each heater of the first pair of heaters is connected for energization in accordance with the vector sum of voltage and current of the circuit. Consequently, these heaters radiate larger amounts of heat than the heaters of the second pair of heaters when the thermal device is connected for energization from the three-wire circuit. By reason of the compact mechanical arrangement of the various elements of the Vassar device, each heater of the first pair of heaters may exert an influence upon the second thermoresponsive element of the device, especially for conditions of relatively large values of power of the electrical circuit. Inspection of Figure 1 of the Vassar patent reveals that one heater of the first pair of heaters is positioned closer than the other heater thereof to the second thermoresponsive element. Consequently, for energization of the separate meter elements by substantially equal values of power, the heater of the first pair of heaters which is positioned closer than the other heater of the first pair of heaters to the second thermoresponsive element exerts a slightly greater influence thereon than the other heater of the first pair of heaters. For this reason, the response of the thermal device for energization of one of the elements thereof by a certain value of power differs to a slight degree from the response of the device for energization of the other element thereof by the same value of power.

In accordance with the invention, a heat conductive path is provided between the one heater of the first pair of heaters which is positioned further than the other heater of the first pair of heaters from the second thermoresponsive element for the purpose of rendering both heaters of the first pair of heaters equally effective upon the second thermoresponsive element for identical degrees of energization thereof. The heat conductive path may conveniently comprise a plate of suitable heat conducting material, such as aluminum or copper, positioned to effect the transfer of heat from the remotely positioned heater to the second thermoresponsive element. If desired, another plate may be provided in order to reflect heat away from the second thermoresponsive element. For this purpose, the surface of the reflecting plate is preferably polished to a bright finish.

The invention also contemplates the provision of a heat conductive plate which extends between external surfaces of the enclosures for the pair of thermoresponsive elements. This plate functions to transfer heat between the separate enclosures for the dual purpose of reducing the time of response of the meter and effecting proper phase balance of the meter.

It is, therefore, an object of the invention to provide a thermal device with improved control means therefor.

It is another object of the invention to provide a two-element thermal demand meter with improved means for controlling the phase balance thereof.

It is a further object of the invention to provide a two-element thermal demand meter having a pair of thermo-responsive elements and heaters associated therewith with means for controlling the transfer of heat between one of the thermoresponsive elements and the heaters associated with the other of the thermoresponsive elements.

It is still another object of the invention to provide a two-element thermal demand meter having a pair of thermoresponsive elements and heaters associated therewith with heat-conductive metallic means positioned to substantially equalize the thermal effects upon one of the thermoresponsive elements produced by the heaters associated with the other of the thermoresponsive elements for identical degrees of energization of the separate meter elements.

It is still a further object of the invention to provide a two-element thermal demand meter with improved means for controlling both the time of response and the phase balance thereof.

Other objects of this invention will become apparent from the following description, when taken in conjunction with the accompanying drawings, in which:

Figure 1 is a view in section with parts broken away of an electrical measuring device including a thermoresponsive device embodying the invention;

Fig. 2 is a view in perspective of a thermoresponsive device similar to that disclosed in Figure 1;

Fig. 3 is a view similar to Fig. 2 showing a modification of the invention of Figs. 1 and 2;

Fig. 4 is a view in perspective of a preferred type of heat-conductive metallic member suitable for the thermoresponsive devices of Figures 1 and 2;

Fig. 5 is a view in section of a portion of a thermoresponsive device showing a further modification of the invention of Figs. 1 and 2; and Fig. 6 is a view in section with parts broken away of a thermoresponsive device showing another modification of the invention of Figs. 1 and 2.

With reference to Fig. 1, there is shown a combination energy and power demand measuring device 2 similar to that shown and described in the aforesaid Vassar patent and including an integrating watthour meter 3 and a thermal demand meter 4. The device 2 is preferably of the detachable socket type having a conventional base plate 6 and a transparent cover 8. Suitable contact blades are provided to cooperate with contact jaws (not shown) to connect the measuring device 2 for energization from a three-wire alternating-current circuit (not shown). One of the contact blades is represented by the numeral 10. The circuit (not shown) may be in the form of a three-wire, single-phase circuit or a three-wire, three-phase circuit. For purposes of the invention, it will be assumed that the measuring device 2 is connected for energization from a three-wire, three-phase alternating-current circuit operating at a frequency of 60 cycles per second. A circuit of this type for energizing a thermal meter is disclosed in the Smith Patent 1,417,695.

The thermal demand meter 4 may be similar in construction and operation to the thermal meter shown and described in the aforesaid Vassar patent. As illustrated in Figure 1, the device 4 comprises a pair of thermoresponsive elements 14 and 16 which conveniently may be in the form of bimetallic spiral springs. An insulating enclosure 18 comprising separable cap and base portions 20 and 22 is provided for the thermoresponsive element 14. In a like manner, an insulating enclosure 24 having separable cap and base portions 26 and 28 is provided for the thermoresponsive element 16. As shown in Figure 1, the thermoresponsive device 4 is mounted on a base member 29 of suitable heat insulating material. An integral web member 30 may be provided to connect the enclosures 18 and 24. The thermoresponsive elements 14 and 16 are associated with a rotatably mounted shaft 32 and are mounted in opposing relation on the shaft to exert opposing torques thereon when energized. The inner ends of the spiral springs 14 and 16 are affixed to the shaft 32 and the outer ends thereof are fixed in permanent positions Energization of the springs 14 and 16 effects rotation of the inner ends thereof relative to the fixed outer ends thereof.

In order to effect energization of the spiral springs 14 and 16 to provide a measurement of the power demand of the three-wire, three-phase alternating current circuit (not shown), a plurality of heaters 34, 36, 38 and 40 are positioned adjacent the surfaces of the springs 14 and 16 which are disposed radially of the shaft 32. The heaters 34 and 36 may be connected for energization in accordance with the vector sum and difference of an alternating current and voltage of a pair of wires of the three-wire circuit (not shown). In a similar manner, the heaters 38 and 40 may be connected for energization in accordance with the vector sum and difference of an alternating current and voltage of another pair of wires of the three-wire circuit (not shown). The heaters 34 and 36 comprise one element of the two-element meter and the heaters 38 and 40 comprise the other element of the two-element meter. As shown, the heaters 34 and 36 are positioned to heat corresponding radial surfaces of the thermoresponsive elements 16 and 14, respectively, whereas the heaters 38 and 40 are positioned to heat the remaining radial surfaces of the thermoresponsive elements 16 and 14, respectively. A suitable pusher arm 42 may be affixed to the free end of the rotatably mounted shaft 32 for rotation therewith. A demand pointer 44 is conveniently disposed in the path of the pusher arm 42 to be actuated thereby across a suitable scale 45 to produce an indication of the maximum power demand of the three-wire circuit (not shown) as is understood in the art. Suitable resetting mechanism 46 may be provided to reset the demand pointer 44 to any desired position.

In order to improve the accuracy of response of the thermoresponsive device 4, means are provided to correct the phase balance thereof. The term "phase balance" may be explained as follows. Assuming that the heaters 34 and 36 of one element of the two element device are energized by a predetermined amount of power, then a certain response will be produced by the device 4. Now, assuming that the heaters 38 and 40 of the other element of the two-element device are energized by the same amount of power as was applied to heaters 34 and 36, then the device 4 should produce substantially the same response as was produced during energization of heaters 34 and 36. It is to be noted that heaters 34 and 38 are heated in accordance with the vector sum of alternating currents and voltages of the three-wire circuit (not shown). By reason of the disposition of the heaters 34 and 38 relative to the thermoresponsive element 14, phase balance of the device 4 is not ordinarily realized unless corrective measures are taken. This may be explained as follows.

In order to provide a compact structure, it is desirable to have the spiral springs and the heaters associated therewith disposed relatively close to one another, and to position the heaters adjacent radial surfaces of the spiral springs as shown in Figure 1. When the device 4 is connected for energization from the three-wire circuit (not shown), the heaters 34 and 38 are energized to a greater extent than the heaters 36 and 40 and may produce thermal effects upon the spiral spring 14, especially for large values of power of the three-wire circuit (not shown). Inasmuch as the heater 38 is positioned closer than the heater 34 to the spiral spring 14, the thermal effects produced by the heaters 34 and 38 upon the spring 14 for substantially identical degrees of energization of the separate meter elements may deviate to a slight extent from equality with the heater 38 exerting a greater influence than the heater 34 upon the spring 14. Since the spiral springs 14 and 16 are acting in opposition upon the shaft 32, the response of the meter element comprising heaters 38 and 40 is slightly less than the response of the meter element comprising heaters 34 and 36 for separate energization of the two meter elements by the same value of power.

In order to have the heaters 34 and 38 produce substantially identical thermal effects upon the thermoresponsive element 14 for separate energizations of the meter elements by substantially the same values of power, a heat-conductive path may be provided between the heater 34 and the thermoresponsive element 14. The heat-conductive path is effective to transfer heat from heater 34 to thermoresponsive element 14, thereby increasing the influence of heater 34 upon element 14 to the extent that heaters 34 and 38 produce substantially identical thermal effects upon element 14 under identical conditions of energization of the meter elements.

The heat-conductive path may conveniently comprise a plate member 48 constructed of a suitable heat-conducting metal such as copper or aluminum. As illustrated in Figures 1, 2 and 4, the member 48 may be channel-shaped, having terminal portions 50 and 52 and an integral connecting portion 54. In order to permit the member 48 to be positioned on the enclosure 24 in effective heat-transferring relation relative to the heater 34 and the spiral spring 14, the terminal portions 50 and 52 of the member 48 are preferably of substantially U-shaped configuration to provide depending leg members 56 and 58 respectively. The terminal portions 50 and 52 define a pair of spaced parallel planes whereby the leg members 56 and 58 may be positioned to straddle the shaft 32 for engaging surfaces of the enclosure 24 which are disposed radially of the shaft 32. As shown, the leg members 56 are positioned in straddling relation relative to the shaft 32 to engage a substantial portion of the radial surface of the enclosure 24 adjacent the heater 34. In a similar manner, the leg portions 52 are positioned to straddle the shaft 32 for engaging a substantial portion of the radial surface of the enclosure 24 which is adjacent the spiral spring 14. The effect of the member 48 may now be explained as follows:

Assuming that the two elements of the device 4 are connected separately for energization by substantially the same value of power without the provision of the member 48, then the response of the device 4 for energization of the element which includes heaters 34 and 36 will be somewhat greater than the response of the device 4 for energization of the element including heaters 38 and 40 because the heater 38 has a greater influence upon the spring 14 than the heater 34, as explained hereinbefore. Provision of the member 48 permits a portion of the heat emanating from the heater 34 to be transferred to the leg members 56 of the terminal portion 50 through the portion 54 to the terminal portion 52 for radiation to the spring 14. Properties of the member 48 are preferably such that the member 48 effects the transfer of a quantity of heat from the heater 34 to the spring 14 sufficient to render the heaters 34 and 38 equally effective upon the spring 14 for identical conditions of energization of the two meter elements.

In order to further improve the phase-balance of the device 4, an additional metallic member 60 may be provided for the enclosure 18. The member 60 may be similar in configuration to the member 48 and is provided with terminal portions 62 and 64 and a connecting portion 66 in order to reflect heat radiating from heaters 34 and 38 away from the spiral spring 14. To this end, the surfaces of the member 60 are preferably polished to a bright finish to provide substantial thermal reflectivity. As shown in Figures 1 and 2, the member 60 is positioned relative to the enclosure 18 in a manner similar to the positioning of the member 48 relative to the enclosure 24. The member 60 effectively reduces the amount of heat absorbed by the enclosure 18 thereby cooperating with the member 48 to equalize the thermal effects of the heaters 34 and 38 upon the spring 14.

As illustrated in Fig. 5, a metallic member 68 having terminal portions 70 and 72 and a connecting portion 74 similar in configuration to the corresponding portions of members 48 and 66 may be molded or imbedded within the enclosure 24. It is to be noted that the spacing of terminal portions 70 and 72 of the member 68 is somewhat less than the spacing of the terminals 50 and 52 of the member 48 and of the terminals 62 and 64 of the member 60 in order to permit positioning of the member 68 intermediate external surfaces of the enclosure 24 and the heaters 34 and 38. The effect of the member 68 is the same as that of the member 48 and need not be described.

The invention also contemplates that a heat-conductive member 76 may be positioned to have a terminal thereof in direct engagement with portions of the heater 34. As illustrated in Fig. 6, the member 76 is provided with terminal portions 78 and 80 and a connecting portion 82. In order to effect the transfer of heat from heater 34 to spring 14, the member 76 is preferably constructed of a suitable heat conducting metal and is positioned relative to enclosures 18 and 24 to have the terminal 78 in direct contact with the lower portion of the heater 34, and to have the other terminal 80 in heat-transfer relation relative to the thermoresponsive element 14. As shown, the integral connecting portion 82 extends through base member 28 of enclosure 24 and through the integral web 30 into the base member 22 of enclosure 18. The member 76 is effective to transfer heat from heater 34 to spring 14 in the same manner as the members 48 and 68.

Another embodiment of the invention is illustrated in Fig. 3. As there shown, a metallic member 84 comprising terminal portions 86 and 88 and a connecting portion 90 is associated with both enclosures 18 and 24. As illustrated, the connecting portion 90 extends between and engages substantially the entire top surfaces of the cap members 20 and 26 of the enclosures 18 and 24, respectively. The metallic member 84 serves the dual purpose of reducing the time of response of the device 4 as well as effecting the proper phase-balance thereof. The terminal portions 86 and 88 are positioned to effect the transfer of heat from the heater 34 to the element 14 in the manner previously described in connection with members 48, 68 and 76. The terminal portion 88 may conveniently be in engagement with a radial surface of the enclosure 18, rather than a radial surface of the enclosure 24, to more effectively transfer heat to the spiral spring 14. If desired, an additional terminal portion (not shown) may be provided for the member 84 to engage the remaining radial surface of the enclosure 18. The effect of the integral portion 90 upon the time of response of the device 4 may be described as follows: Inasmuch as the portion 90 is separated from the heaters 34, 36, 38 and 40 by substantial insulation, the device 12 responds to a suddenly applied load at a rate substantially as rapid as though the portion 90 were not employed. However, since the portion 90 is effective to conduct heat between the enclosures 18 and 24, the final difference in the temperatures of the thermoresponsive elements 14 and 16 is less than that which would be obtained if the portion 90 were omitted. Consequently, the final indication of the device 4 is substantially less than it would be were the portion 90 omitted, and the unit will reach 90% of its final value in a shorter time interval than would be obtained if the portion 90 were omitted. Inasmuch as the demand interval of a thermal demand meter may be defined as the time necessary for the meter to indicate 90% of the final value of a suddenly applied lead, it is apparent that the time of response of the device 4 may be substantially reduced by provision of the integral member 90 in the manner described.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a thermal device, a pair of thermoresponsive elements, means differentially associating said thermoresponsive elements to produce a resultant response therefrom which is a function of the difference in heating of said thermoresponsive elements, a separate pair of heaters effective when energized for influencing each of said thermoresponsive elements, said heaters lying in parallel spaced first planes, an insulating enclosure for each of said thermoresponsive elements and the pair of heaters associated therewith, one pair of heaters influencing the thermoresponsive element associated with the other pair of heaters, one heater of said one pair of heaters exerting a greater influence than the other heater of said one pair of heaters upon said last-named thermoresponsive element for substantially equal degrees of energization of said one heater and said other heater, and heat-conductive means for causing said one heater and said other heater to exert substantially the same influence upon said last-named thermoresponsive element for substantially equal degrees of energization of said one heater and said other heater, said heat-conductive means comprising a heat-conductive metallic member having a pair of terminal portions positioned respectively in heat-transfer relation with said other heater and said last-named thermoresponsive element, said terminal portions lying in a pair of spaced second planes parallel to said first planes, said terminal portions being spaced by a greater distance than the spacing between said one pair of heaters and being in engagement with the enclosure for said one pair of heaters.

2. In a thermal device, a pair of thermoresponsive elements, means differentially associating said thermoresponsive elements to produce a resultant response therefrom which is a function of the difference in heating of said thermoresponsive elements, a separate pair of heaters effective when energized for influencing each of said thermoresponsive elements, said heaters lying in parallel spaced first planes, an insulating enclosure for each of said thermoresponsive elements and the pair of heaters associated therewith, one pair of heaters influencing the thermoresponsive element associated with the other pair of heaters, one heater of said one pair of heaters exerting a greater influence than the other heater of said one pair of heaters upon said last-named thermoresponsive element for substantially equal degrees of energization of said one heater and said other heater, and heat-conductive means for causing said one heater and said other heater to exert substantially the same influence upon said last-named thermoresponsive element for substantially equal degrees of energization of said one heater and said other heater, said heat-conductive means comprising a heat-conductive metallic member having a pair of terminal portions lying in a pair of spaced second planes parallel to said first planes, said terminal portions engaging external surfaces of the enclosure for said one pair of heaters in heat transfer relation respectively with said other heater and said last-named thermoresponsive element.

3. In a two-element thermal meter for measuring the demand of an electrical circuit, first and second thermoresponsive elements, means differentially associating said thermoresponsive elements to produce a resultant response therefrom which is a function of the difference in heating of said thermoresponsive elements, first and second heaters for said first and second thermoresponsive elements adapted to be connected respectively for energization in accordance with the vector sum and difference of a voltage and a current of the circuit to provide one element of the two-element meter, said first and second heaters lying in parallel spaced first planes, third and fourth heaters for said first and second thermoresponsive elements adapted to be connected respectively for energization in accordance with the vector sum and difference of a voltage and a current of the circuit to provide the other element of the two-element meter, said third and fourth heaters lying in spaced second planes parallel to said first planes, a first insulating enclosure for said first thermoresponsive element and said first and third heaters, a second insulating enclosure for said second thermoresponsive element and said second and fourth heaters, said first and third heater influencing said second thermoresponsive element, said first heater being positioned further than the third heater from said second thermoresponsive element to exert a lesser influence than the third heater upon the second thermoresponsive element for substantially equal degrees of energization of said first and third heaters, and heat-conductive means for causing said first and third heaters to have substantially identical thermal effects upon said second thermoresponsive element for separate energization of the two meter elements by substantially equal values of power, said heat-conductive means comprising a heat-conductive metallic member having a pair of terminal portions lying in a pair of spaced third planes parallel to said first and second planes, said terminal portions being spaced by a greater distance than the spacing between said first and third heaters, and being in engagement with said first enclosure in heat-transfer relation respectively with said first heater and said second thermoresponsive element.

4. In a two-element thermal meter for measuring the demand of an electrical circuit, first and second thermoresponsive elements, means differentially associating said thermoresponsive elements to produce a resultant response therefrom which is a function of the difference in heating of said thermoresponsive elements, first and second heaters for said first and second thermoresponsive elements adapted to be connected respectively for energization in accordance with the vector sum and difference of a voltage and a current of the circuit to provide one element of the two-element meter, said first and second heaters lying in parallel spaced first planes, third and fourth heaters for said first and second thermoresponsive elements adapted to be connected respectively for energization in accordance with the vector sum and difference of a voltage and a current of the circuit to provide the other element of the two-element meter, said third and fourth heaters lying in spaced second planes parallel to said first planes, a first insulating enclosure for said first thermoresponsive element and said first and third heaters, a second insulating enclosure for said second thermoresponsive element and said second and fourth heaters, said first and third heaters influencing said second thermoresponsive element, said first heater being positioned further than the third heater from said second thermoresponsive element to exert a lesser influence than the third heater upon the second thermoresponsive element for substantially equal degrees of energization of said first and third heaters and heat-conductive means for causing said first and third heaters to have substantially identical thermal effects upon said second thermoresponsive element for separate energization of the two meter elements by substantially equal values of power, said heat-conductive means comprising a heat-conductive metallic member having a pair of terminal portions lying in a pair of spaced third planes parallel to said first and second planes, said terminal portions engaging external surfaces of said first enclosure in heat transfer relation respectively with said first heater and said second thermoresponsive element.

References Cited in the file of this patent

UNITED STATES PATENTS

| 2,323,738 | Vassar | July 6, 1943 |
| 2,325,438 | Thomas et al. | July 27, 1943 |
| 2,569,868 | Paine | Oct. 2, 1951 |
| 2,647,235 | Hogenbirk | July 28, 1953 |